United States Patent Office 3,150,159
Patented Sept. 22, 1964

3,150,159
REMOVAL OF HYDROCARBON DEGRADATION PRODUCTS FROM ORGANIC SOLUTIONS
John M. Schmitt, Oak Ridge, Tenn., assignor to the United States of America as represented by the United States Atomic Energy Commission
No Drawing. Filed Sept. 22, 1961, Ser. No. 140,149
6 Claims. (Cl. 260—429.1)

My invention relates to liquid-liquid extraction processes for the separation and segregation of metal values, and particularly to methods of removing impurities from water-immiscible organic liquids used in these extraction processes.

It is common practice in liquid-liquid extraction processes wherein an aqueous metal value-bearing solution is contacted with a water-immiscible organic extractant to dilute the extracting agent with a hydrocarbon. This may be done to change the viscosity or density of the organic phase, or for other reasons. Although hydrocarbons are useful as diluents, difficulties arise when a hydrocarbon-containing organic phase is contacted with an aqeuous phase containing nitric acid. Nitric acid reacts with hydrocarbons formng degradation products which adversely affect the extraction in some processes.

For instance, in solvent extraction processes for the separation of uranium from fission product values wherein an acidic aqueous nitrate solution containing uranium values together with fission product values is contacted with an organic solution comprising a trialkylphosphate and a hydrocarbon diluent, thereby selectively transferring uranium values to the organic solution, hydrocarbon degradation products accumulate in the organic phase. These degradation products have high extraction powers for some fission products, notably zirconium and niobium, and thus their presence in the organic solution results in poor separation of uranium from these fission products.

In the prior art these degradation products have been removed from the organic solution by contacting the organic solution with a solid adsorbent. In one method the organic phase is first contacted with sodium carbonate and then with solid manganese dioxide, the degradation products sorbing on the manganese dioxide. Although this method removes the degradation products from the organic solution, handling highly radioactive solids presents problems in processes which must be carried out by remote control, and a method of removing the degradation products by a liquid-liquid contacting method is preferable.

It is accordingly one object of my invention to provide an improved process for removing impurities from an organic solution.

It is another object to provide a liquid-liquid contacting process for removing hydrocarbon degradation products from an organic solution containing said degradation products.

It is still another object to provide a liquid-liquid contacting process for removing from an organic solution hydrocarbon degradation products having a high extraction power for uranium fission products.

Other objects of my invention will be apparent from the following description and the appended claims.

I have discovered that water-soluble amines, diamines, and alkanolamines form complexes with reaction products of hydrocarbons and nitric acid, and, in accordance with my invention, I have provided a method for removing reaction products of a hydrocarbon and nitric acid from an organic solution containing said reaction products comprising the steps of contacting said organic solution with a water-soluble liquid amine represented by the formulas

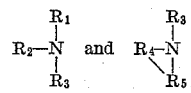

where $R_1$ is a member selected from the group consisting of alkyl, alkoxy and amino alkyl radicals, $R_2$ and $R_3$ are members selected from the group consisting of hydrogen, alkyl and alkoxy radicals, and $R_4$—$R_5$ represents a carbon and hydrogen containing group, thereby transferring said reaction products from said organic solution into said liquid amine and separating the resulting purified organic solution from the reaction product-loaded amine.

My invention is useful in removing reaction products of nitric acid and liquid hydrocarbons from any water-immiscible organic solution containing these reaction products. My invention is particularly useful in separating these reaction products from organic solutions used in liquid-liquid extraction processes for separating uranium from fission products. A typical solvent extraction process in which my invention is useful is disclosed in U.S. Patent No. 2,848,300, issued August 19, 1958, to James C. Warf for "Process of Separating Uranium From Aqueous Solutions by Solvent Extraction."

In this description and in the claims the use of the word "amines" is intended to include primary, secondary and tertiary amines, diamines and alkanolamines; "organic solution" is intended to mean the water-immiscible organic solutions to be purified (as distinguished from the solution containing the water-soluble amine); and "hydrocarbon degradation products" refers to the reaction products of a hydrocarbon and nitric acid, nitrous acid, or acidic metal nitrate solution.

My invention is useful in purifying organic solutions containing any of the hydrocarbon diluents and a wide variety of the organic extractants suitable for use in solvent extraction processes. The organic solution may contain any organic extractant which does not form interfering salts with the water-soluble amines. The organic extractant must be non-acidic. Acidic extractants, such as dialkylphosphoric acids, form salts with these amines which transfer into the aqueous phase with the impurities. Typical of the organic extractants, which may be a component of solutions purified by my process, are the ethers, organo-phosphorus compounds, as exemplified by the trialkylphosphates, and organo-nitrogen compounds as exemplified by the long-chain amines. All hydrocarbons from degradation products with nitric acid, the branched and aromatic hydrocarbons being more reactive than the straight-chain hydrocarbons. Typical of the hydrocarbons useful in liquid-liquid extraction processes are the kerosenes, naphthas, alkylated benzenes, aviation naphthas and the straight-chain hydrocarbons containing from 6–14 carbon atoms. Hydrocarbons, in contact with nitric acid, form reaction products to some extent regardless of the concentration of the nitric acid or the hydrocarbon. Their rate of formation increases with an increase in acidity. Other factors which increase the rate of formation are high temperatures, irradiation, and the presence of catalysts such as trialkylphosphates and metal ions.

In carrying out my invention the organic solution containing hydrocarbon-nitric acid reaction products is contacted with a water-soluble amine. In a liquid-liquid extraction process for the separation of metal values this may be carried out at any stage; however, it is preferred to contact the amine and the organic solution after extracted metal values have been stripped from the organic solution. All water-soluble amines are useful in my process. Water solubility in this context includes the property of low solubility in the organic water-immiscible phase. Water solubility varies with the length of the carbon chains and the presence of water solubilizing groups, e.g., hydroxyl groups in the chain, decreasing as the number of carbon atoms in the chain increases and increasing as the number of solubilizing groups in the molecule increases. Examples of amines useful in my process are ethanol amine, triethanol amine, ethylene diamine, dipropyl amine, n-butyl amine, propanol amine, butanol amine, triethyl amine, and pyridine.

Although an undiluted amine may be used, in some instances the undiluted amine removes a portion of the water-immiscible organic extractant from the organic solution together with the hydrocarbon reaction products. I have discovered, however, that in these cases dilution of the amine with water or a glycol significantly reduces the amount of extractant removed from the organic solution. For instance, an undiluted ethylene diamine will remove as high as 40 percent of tributyl phosphate from a 30 percent tributylphosphate, 70 percent aviation naphtha mixture; if the ethylene diamine contains 20 percent water, the loss of tributylphosphate to the amine phase is insignificant. With some amines, e.g., ethanol amine, no dilution of the amine is necessary, little of the organic extractant being transferred into even a pure amine.

The temperature at which the contact is made between the amine and the organic solution is not critical.

The phase ratio of amine:organic solution is not critical, some purification of the organic solution being accomplished regardless of the relative amounts of the two liquids. Phase ratios amine:organic of 1:1 to 1:10 are suitable.

The contact time is not critical, some purification being accomplished in even a short time; however, for a fixed phase ratio, increasing the contact time increases the purification.

Having thus described my invention, the following examples are given to illustrate my invention in more detail.

EXAMPLE I

In order to determine the composition of the reaction product of a typical hydrocarbon diluent and nitric acid, Amsco 125–82 (an aromatic petroleum fraction) was refluxed with an equal volume of 8 molar nitric acid at 107° C. for 5–7 hours. The resulting hydrocarbon solution was contacted with alumina which sorbed the reaction products. The sorbed reaction products were eluted from the alumina with acetone and recovered by evaporating the acetone. Analysis of the reaction products showed carbon 75.2 percent, hydrogen 12.6 percent, and nitrogen 2.72 percent. Infrared and ultraviolet tests showed the presence of nitroparaffins. These products were not present in fresh Amsco 125–82.

This example is intended to show typical conditions under which reaction products of a hydrocarbon and nitric acid form. These conditions were severe, but reaction products also form at reduced temperatures.

EXAMPLE II

A solution of 30 percent tributylphosphate in Amsco 125–82 containing 5 percent by volume of the solution prepared in Example I is treated to remove tributylphosphate degradation products (e.g., dibutylphosphate) by scrubbing with two equal volumes of two percent NaOH. The resulting solution is then divided into two portions. The first portion is treated in accordance with my invention and then tested for zirconium and niobium extraction power as described in Example III below. The second portion is contacted with an equal volume of a solution 2 molar in nitric acid and containing radioactive zirconium and niobium. The two phases are separated and the zirconium and niobium in each phase is analyzed. The results are given in Table I following Example III.

EXAMPLE III

The first portion of the tributylphosphate-Amsco solution prepared in Example II is contacted with three equal volumes of a 100 percent solution of ethanol amine, 10 minutes being taken for each contact. The two phases are then separated and the tributylphosphate solution is contacted with an equal volume of an aqueous solution identical to the zirconium and niobium-containing solution of Example II. The conditions of contact are the same as in Example II. The two phases are separated and the zirconium and niobium in each phase is analyzed. The results are given in Table I. The extraction coefficient $E^{o/a}$ is a ratio of the concentration of zirconium and niobium in the organic phase to the concentration of these elements in the aqueous phase.

*Table I*

| | Extraction coefficient $E^{o/a}$ zirconium and niobium |
|---|---|
| Example II (organic solution containing degradation products) | 0.180 |
| Example III (purified organic solution) | 0.035 |

As can be seen from the above table, the purification step decreases the extraction of the organic solution for zirconium and niobium, thereby increasing the degree of separation of uranium from zirconium and niobium.

The following example illustrates the use of my invention in a liquid-liquid extraction process for separating uranium from fission products.

EXAMPLE IV

A solution of 30 percent tributylphosphate in kerosene is contacted with an aqueous solution 2 molar in nitric acid and containing 400 grams uranium per liter and uranium fission products. The two phases are separated and extracted uranium values are removed from the organic phase by contacting the organic phase with a stripping solution comprising 0.01 molar nitric acid. The stripping solution containing the uranium values is separated from the tributylphosphate-kerosene solution and uranium values are removed from said stripping solution. The tributylphosphate-kerosene solution is contacted for a period of one hour with an aqueous solution containing 100 percent ethanolamine. The purified tributylphosphate solution is then separated from the aqueous amine solution and is brought into contact with additional aqueous nitric acid solution containing uranium and uranium fission product values and the above cycle is repeated.

The above examples are intended only to illustrate my invention which should be limited only in accordance with the following claims.

Having thus described my invention, I claim:

1. In a liquid-liquid extraction process for the separation and segregation of metal values contained in an aqueous nitric acid solution, comprising the steps of contacting said aqueous solution with an organic solution comprising a non-acidic organic extracting agent selected from the group consisting of ethers, organophosphorus compounds and organonitrogen compounds dissolved in a liquid hydrocarbon, whereby metal values are selectively transferred from said aqueous solution into said organic solution and hydrocarbon degradation products are formed in said organic solution, separating the resulting metal value-loaded organic solution from the depleted aqueous solution, recovering metal values from said separated organic solution, and contacting the resulting depleted organic solution with additional metal value-containing aqueous solution, the improvement comprising the steps of contacting the depleted organic solution with a water-soluble liquid amine selected from the group consisting of members having the formulas

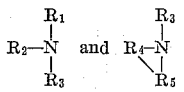

where $R_1$ is a member selected from the group consisting of alkyl, hydroxyalkyl and amino alkyl radicals, $R_2$ and $R_3$ are members selected from the group consisting of hydrogen, alkyl, hydroxyalkyl and alkoxy radicals, and $R_4$—$R_5$ represents a carbon and hydrogen-containing group, and separating the resulting purified organic solution from the resulting amine solution.

2. The improvement of claim 1 wherein the water-soluble amine is represented by the formula

where $R_1$ is an hydroxyalkyl radical and $R_2$ and $R_3$ are members selected from the group consisting of hydrogen, alkyl, hydroxyalkyl and alkoxy radicals.

3. The improvement of claim 1 wherein the water-soluble amine is ethanol amine.

4. In a liquid-liquid extraction process for the separation of uranium values from an aqueous acidic solution containing said values together with nitrate values and zirconium and niobium fission product values comprising the steps of contacting said aqueous solution with an organic solution comprising a non-acidic organic extracting agent selected from the group consisting of ethers, organophosphorus compounds and organonitrogen compounds dissolved in a liquid hydrocarbon, whereby uranium values are selectively transferred from said aqueous solution into said organic solution and degradation products of said hydrocarbon are formed in said organic solution, separating the resulting uranium value-loaded organic solution from the depleted aqueous solution, recovering uranium values form said separated organic solution, and contacting the resulting uranium-depleted organic solution with additional uranium, nitrate value and fission product value containing aqueous solution, the improvement comprising the steps of contacting the uranium-depleted organic solution with a water-soluble liquid amine selected from the group consisting of members having the formulas

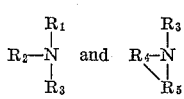

where $R_1$ is a member selected from the group consisting of alkyl, hydroxyalkyl and amino alkyl radicals, $R_2$ and $R_3$ are members selected from the group consisting of hydrogen, alkyl, hydroxyalkyl and alkoxy radicals and $R_4$—$R_5$ represents a carbon and hydrogen-containing group, thereby removing hydrocarbon degradation products from the organic solution, and separating the resulting purified organic solution from the resulting amine solution.

5. The process of claim 4 wherein the amine is represented by the formula

where $R_1$ is an hydroxyalkyl radical and $R_2$ and $R_3$ are members selected from the group consisting of hydrogen, alkyl, hydroxyalkyl and alkoxy radicals.

6. The process of claim 4 wherein the amine is ethanol amine.

No references cited.